F. M. MECUM.
POWER LIFT FOR CRANK AXLE IMPLEMENTS.
APPLICATION FILED NOV. 8, 1918.
1,349,900.
Patented Aug. 17, 1920.
2 SHEETS—SHEET 1.
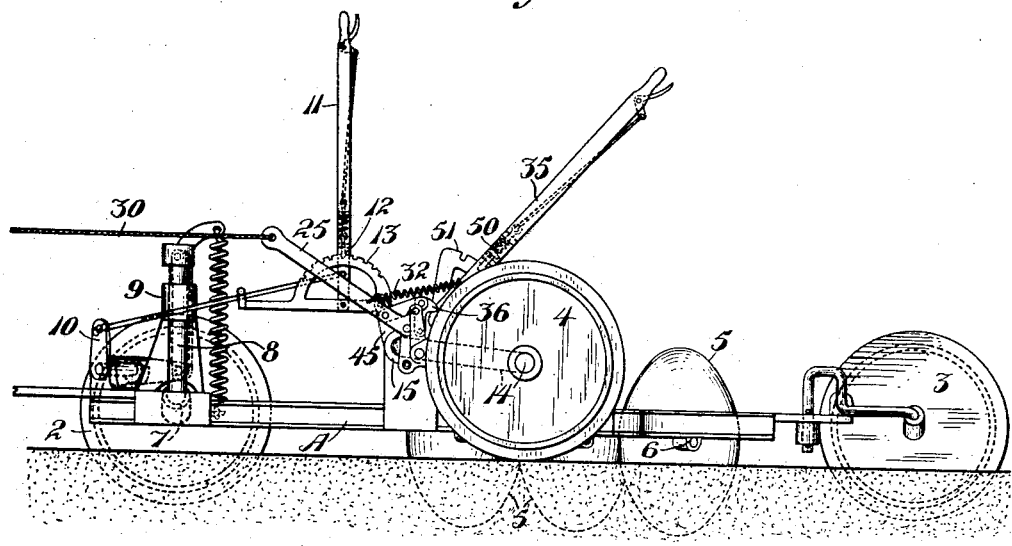
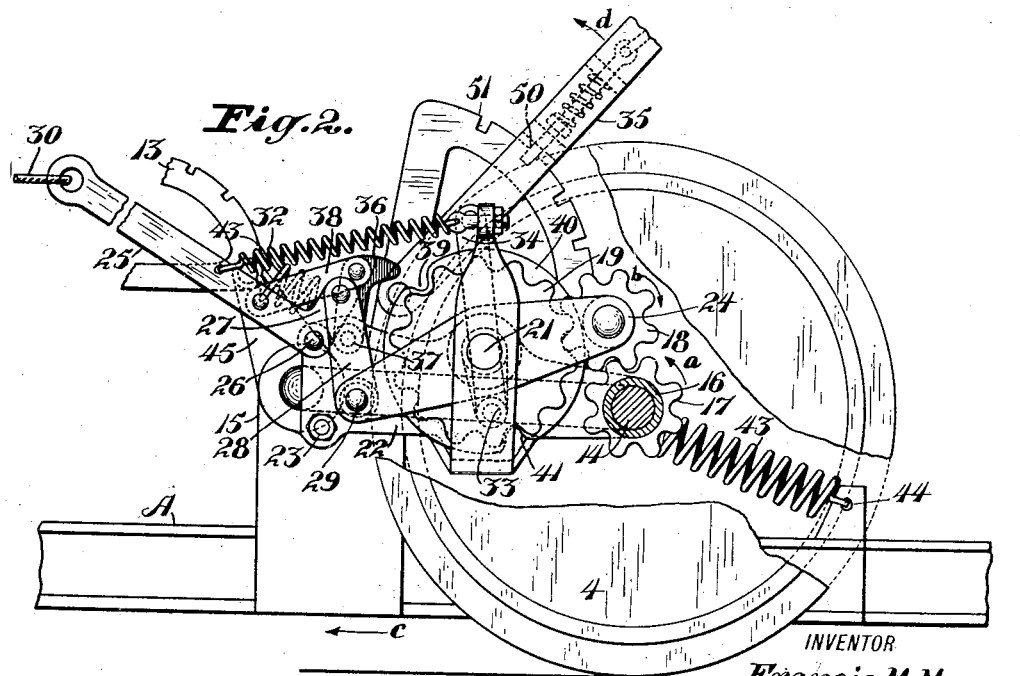
INVENTOR
Francis M. Mecum
BY
Strong & Townsend
ATTORNEYS F. M. MECUM.
POWER LIFT FOR CRANK AXLE IMPLEMENTS.
APPLICATION FILED NOV. 8, 1918.

1,349,900.

Patented Aug. 17, 1920.
2 SHEETS—SHEET 2.

INVENTOR
*Francis M. Mecum*

BY
*Strong & Townsend*
ATTORNEYS

UNITED STATES PATENT OFFICE.

FRANCIS M. MECUM, OF CHICO, CALIFORNIA.

POWER-LIFT FOR CRANK-AXLE IMPLEMENTS.

1,349,900.  Specification of Letters Patent.  Patented Aug. 17, 1920.

Application filed November 8, 1918. Serial No. 261,727.

*To all whom it may concern:*

Be it known that I, FRANCIS M. MECUM, a citizen of the United States, residing at Chico, in the county of Butte and State of California, have invented new and useful Improvements in Power-Lifts for Crank-Axle Implements, of which the following is a specification.

This invention relates to implements such as disk plows, harrows and the like, which employ a crank axle to obtain vertical adjustment, and particularly to a power lift for transmitting movement to the crank axle.

One of the objects of the present invention is to provide a simple and substantial mechanism by which the tractive power of one of the wheels supporting the plow, may be transmitted through the crank axle to raise the land wheel when the plow is entering the ground and to lower it when coming out of the ground.

Another object of the invention is to provide means for positively locking the crank axle when the land wheel is raised or lowered.

Another object of the invention is to provide manually operated means for throwing the power lifting transmission mechanism into or out of operation when it is desired to raise or lower the land wheel.

Further objects will hereinafter appear.

The invention is illustrated by way of example in the accompanying drawings, in which—

Figure 1 is a side elevation of a disk plow, showing the application of the invention.

Fig. 2 is an enlarged detail side elevation partly broken away, showing the power lifting mechanism.

Figure 3:
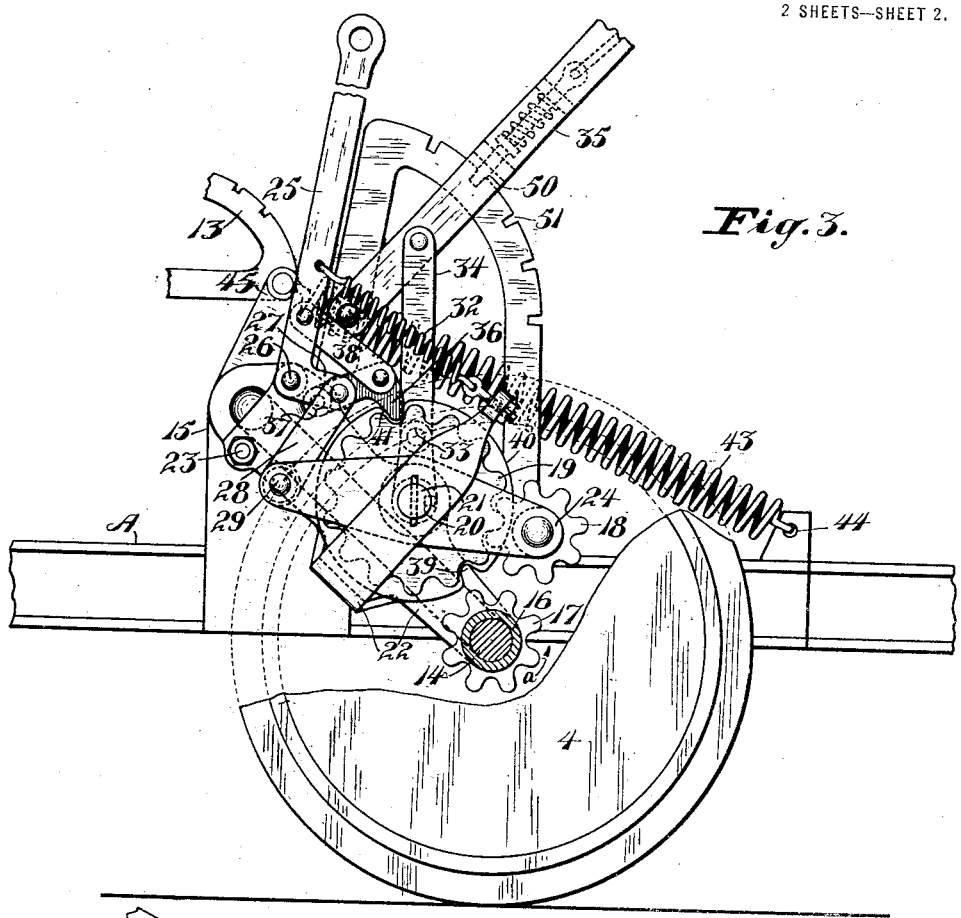
Fig. 3 is similar view, showing the land wheel in a lowered position.

Referring to the drawings in detail, A indicates the main frame of a disk plow; 2, the front furrow wheel; 3, the rear furrow wheel; 4, the land wheel; and 5, the disk plows. The disk plows are permanently journaled or carried by the main frame, as shown at 6, and it is therefore necessary to raise or lower the frame when it is desired to raise or lower the disks 5. This is accomplished by raising or lowering the land and front furrow wheels 4 and 2 respectively, and the mechanism employed for raising or lowering said wheels, forms the subject matter of the present application. The vertical height of the main frame A or the depth to which the disks 5 may enter the ground is regulated by said wheels. The mechanism for raising or lowering the front furrow wheel does, however, not form any part of the present invention and it will therefore merely be briefly referred to.

Figure 4:
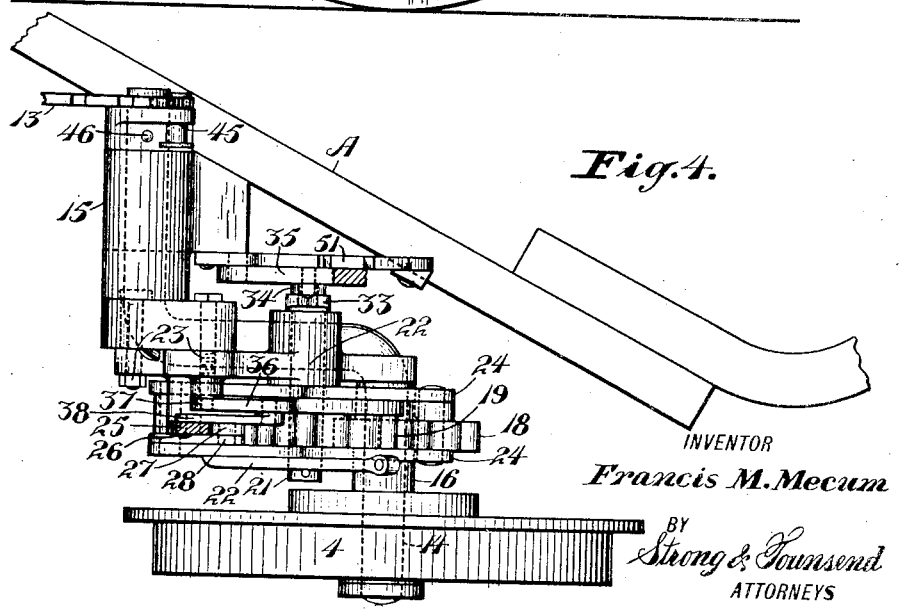
Fig. 4 is a plan view of Fig. 3 partially in section.

The front furrow wheel is journaled on an axle 7, see Fig. 1, which is formed integral with a vertical post 8. This post is slidably mounted in a bracket 9 secured to the main frame and it is raised or lowered in said bracket by means of a crank arm 10 and a lever 11, said lever being provided with a locking pawl 12 which engages a rack 13 when any position of the furrow wheel 2 is secured, thus positively locking the same. The land wheel 4 is also carried by a crank axle, as shown at 14, this crank axle being journaled in a bracket bearing 15 suitably secured to the main frame A, as shown in Figs. 2, 3 and 4. The land wheel is turnably mounted on the free end of the crank axle and it will therefore turn when the plow is operating, as it supports the entire weight of one side of the plow. The turning tractive movement of the land wheel 4 is employed in the present instance to raise or lower the main frame and this is accomplished in the following manner: secured on a sleeve 16 which turns in unison with the land wheel 4 is a pinion gear 17. This pinion is adapted to engage an intermediate pinion 18 which remains in constant mesh with a gear 19. This gear is secured as at 20 on a shaft 21 carried by a bracket 22 which is secured to the crank axle, as shown at 23. The intermediate pinion 18 is journaled in a pair of rocker arms 24 which are pivotally mounted on the shaft 21 and it may therefore be thrown into or out of mesh with the driving pinion 17 by means of a lever 25. This lever is pivotally mounted, as at 26, on the forward end of the bracket 22 carried by the crank axle. The lower end of the lever 25 is provided with a right-angular extension 27, to which is attached a link 28, the opposite end of which is pivotally attached to the rocker arm 24, as shown at 29. Movement of the lever 25, by means of a flexible cable 30 is therefore capable of swinging the rocker arm 24, either to a position where the intermediate gear 18 will intermesh with the driving pinion 17, as shown in Fig. 2, or to a position where it will remain out of mesh with the same, as shown in Fig. 3. A pull on the cable 30 swings the rocker arm to a position where the intermediate gear intermeshes with the pinion 17 while a spring 32, connected with the lever 25, returns the same to the position shown in Fig. 2 and thereby swings the rocker arm to a position where the intermediate gear is thrown out of mesh with the driving pinion. The tractive power of the land wheel may therefore be employed to raise or lower the main frame when the intermediate gear is thrown into mesh with the driving pinion 17. This is due to the fact that the axle 20 carries the crank arm 33 at one end. This crank arm is connected by means of a link 34 with a lever 35 and as the crank arm 33 and the gear 19 will revolve in unison when power is transmitted thereto through the gears 17 and 18, it can readily be seen that the crank axle will swing in its journal bearing 15, either to assume the position shown in Fig. 2 or the position shown in Fig. 3, thereby raising or lowering the main frame of the plow and the disk plows 5 carried thereby.

Referring to Fig. 2 it can be seen that the main frame A has been lowered to a position where the disk plows will enter the ground and it is therefore necessary to release the lever 25 to permit the intermediate gear 18 to swing out of engagement with the driving pinion as a continuous revolution of the intermediate gear, due to the fact that it is intermeshing with the pinion 17, would cause the frame to again rise. It is therefore only necessary to release the lever 25 as the spring 32 attached thereto will immediately return it to normal position. It is also necessary to lock the gear 19 against revolving when the intermediate gear has been thrown out of mesh with the driving pinion as the disk plows 5 might tend to climb out and thereby lift the frame. The locking of the gear 19 is accomplished by means of a pawl 36. This pawl is pivotally mounted on the bracket frame 22 as at 37 and it is attached to the lever 25 by means of a link 38. It therefore moves in unison with said lever and as the lever in this instance is returned from the position shown in Fig. 2 to the position shown in Fig. 3, it can readily be seen that the pawl 36 will move rearwardly and engage a notch 39 formed in the periphery of the gear 19, or rather in the periphery of a disk 40 secured on one side of the gear and turnable in unison therewith. The gear 19 is therefore positively locked and the link 34, which raises or lowers the crank axle, is also locked. There are two notches formed in the periphery of the disk 40; one at the point shown at 39 and one at the opposite side, as shown at 41. The notch 41 is not directly opposite the notch 39 but is slightly in advance thereof. The notch 39 locks the gear against revolution when the frame is lowered and the notch 41, when the frame is raised.

The reason for positioning the notches 39 and 41, as shown, is due to the fact that the land wheel and the gear 17 revolve in the direction of arrow $a$. The intermediate gear will therefore revolve in the direction of arrow $b$ and the gear 19 in the same direction as the land wheel and the gear 17. If the lever 25 is held in the position shown in Fig. 2 when the plow is being pulled in a forward direction or in the direction of arrow $c$, it can be seen that the gear 19 will revolve in the direction indicated. The crank axle will at the same time move upwardly; that is, the end supported in the bearing 15. It is therefore moving in a direction opposite to the rotation of the gear 19 and simultaneously lifting or advancing the position of the pawl 36. This advance of the pawl is taken care of by placing the notch 41 slightly ahead of a central line drawn through the shaft 21 and the notch 39. Similarly, if the frame is being lowered, then it can be seen that the pawl will move downwardly in the same direction as the rotation of gear 19 and it will therefore require less than a half a revolution to bring the pawl 36 into alinement with the notch 39.

The power transmitted through the land wheel is therefore employed not only when it is desired to raise the frame but also when it is desired to lower the same and no manual power or labor will at any time be required as either operation is accomplished by merely operating the lever 25. The amount of power required to lift or raise the frame is comparatively small as the weight of the mechanism required is more or less counterbalanced by means of a spring 43, secured at one end to the main frame, as shown at 44 and at the opposite end to a crank lever 45 secured on the inner end of the crank axle, as shown at 46, see Fig. 4. The spring 43 is extended when the frame is lowered and the tension thus placed thereon is utilized to lift the frame when the disk plows are to be raised out of the ground.

The position of the land wheel will, at all times, practically speaking, control the depth of the furrow and it will also control the lift of the frame or the clearance between the plows and the ground when the plow is being moved from one field to another, the vertical lift being dependent upon the movement of the crank axle and also to a certain extent upon the position of the lever 35. This lever is also provided with a pawl, as shown at 50, which engages notches formed in a rack bar 51. It is therefore possible to change the position of the crank axle with relation to the main frame, by merely changing the position of the lever 35. Movement of said lever in the direction of arrow $d$, increases the depth of the furrow when plowing, while movement of the lever 35 in the opposite direction, decreases the depth of the furrow when plowing. The exact adjustment desired may, however, be further controlled by positioning the front furrow wheel, as previously described.

One of the important features of the present invention is, first, the tractive power of the land wheel may be employed both to raise the plows or to lower the same. Second, to provide a single lever, such as shown at 25, by means of which the tractive power or transmitting mechanism may be thrown into or out of operation. Third, by referring to Figs. 2 and 3, it will be seen that the link 34 and the crank arm 33 will always assume perfect alinement with the shaft 20, whether the land wheel is standing in a raised position or in a lowered position, thus preventing any buckling or shearing tendency, which certainly would take place if such alinement was not obtained. Fourth, the provision of the disk 40 and the pawl 36 serves as a means for positively locking the mechanism when the land wheel is either raised or lowered. Fifth, adjustment of the land wheel with relation to the main frame may be obtained by means of the lever 35 without affecting the normal operation of the power lift. Sixth, the strain and power required to raise the frame is considerably reduced in the present instance as the spring 43 is placed under tension when the frame is lowered; thus it will exert a pull on the arm 45 and materially assist in raising the frame, and thereby reduce the amount of power required.

While a specific form of supporting bracket, such as shown at 15, is here employed, I wish it understood that any other suitable support may be provided and also that the materials and finish of the several parts and the exact construction shown, may be changed, as the experience and judgment of the manufacturer may dictate.

Another feature of the present invention is the provision of means for raising or lowering the front furrow wheel in unison with the land wheel. This is accomplished by securing the rack B to the crank arm 45, see Figs. 1, 2 and 3. The crank arm 45 always swings in unison with the main crank axle 14 as it is formed integral with or secured to the same; hence it is obvious that the rack 13, lever 11 and the connected mechanism will also swing from one position or the other and transmit movement to the crank arm 10, thereby raising or lowering the front furrow wheel in unison with the land wheel.

Having thus described my invention, what I claim and desire to secure by Letters Patent is—

1. The combination with the main frame of a plow and a plurality of furrow openers carried thereby of a crank axle journaled on the frame, a wheel journaled on the free end of the axle, a gear fixed relative to the wheel, a second gear journaled on the crank portion of the crank axle, a connection between the second gear and frame, a lever fulcrumed concentrically with the second gear, a gear carried by the lever for connecting the first two gears, means for locking the second gear against rotation and a single means for rendering said means inoperative and said connecting gear operative.

2. The combination with the main frame of a plow and a plurality of furrow openers carried thereby of a crank axle journaled in the main frame, a land wheel journaled on the free end of the axle, a gear fixed relative to the wheel, a second gear journaled on the crank portion of the crank axle and adapted to be driven by the first gear, a connection between the second gear and frame, a pawl pivoted on a fixed part to lock the second gear from rotation, and means movably supported on the crank portion of the crank axle for controlling the pawl.

3. The combination with the main frame of a plow, of a crank axle journaled in the frame, a wheel journaled on the free end of the crank axle, a shaft journaled on the arm of the crank axle, a gear on the shaft, a lifting connection betwen the gear and frame, a lever pivoted between its ends on the shaft, a gear fixed relative to the wheel, a gear on one end of the lever for connecting the first two gears, a pawl pivotally connected to the arm of the crank axle and arranged to engage the first gear to lock the same against rotation and thereby hold the crank axle either in elevated or lowered position, a single control for concurrently swinging the third gear into and out of operative relation with the first and second gears and disengaging and engaging, respectively, the pawl with the first gear.

4. The combination with the main frame of a plow, of a crank axle journaled in the frame, a wheel journaled on the free end of the crank axle, a shaft journaled on the arm of the crank axle, a gear on the shaft, a lifting connection between the gear and frame, a lever pivoted between its ends on the shaft, a gear fixed relative to the wheel, a gear on one end of the lever for connecting the first two gears, a pawl pivotally connected to the arm of the crank axle and arranged to engage the first gear to lock the same against rotation and thereby hold the crank axle either in elevated or lowered position, a control lever pivotally mounted on the crank axle and connected to the pawl and the opposite end of the first lever for simultaneously disengaging the pawl and rendering the third gear operative.

5. The combination with the main frame of a plow and a plurality of furrow openers carried thereby, of a crank axle journaled in the frame, a land wheel journaled on the free end of the crank axle, a crank arm journaled on the arm of the crank axle, a link attached to said crank arm at one end and to a fixed point on the frame at the opposite end, a gear turnable in unison with the crank arm, an intermediate gear intermeshing with said gear, a driving pinion carried by the land wheel and turnable in unison therewith, and means for moving the intermediate gear to a position where it will intermesh both with the first-named gear and with the driving gear to transmit the revolving movement of the driving gear to turn the first-named gear and the crank arm.

6. The combination with the main frame of a plow and a plurality of furrow openers carried thereby, of a crank axle journaled in the frame, a land wheel journaled on the free end of the crank axle, a crank arm journaled on the arm of the crank axle, a link attached to said crank arm at one end and to a fixed point on the frame at the opposite end, a gear turnable in unison with the crank arm, an intermediate gear intermeshing with said gear, a driving pinion carried by the land wheel and turnable in unison therewith, means for moving the intermediate gear to a position where it will intermesh both with the first-named gear and with the driving gear to transmit the revolving movement of the driving gear to turn the first-named gear and the crank arm, and means for locking the first-named gear and the crank arm turnable in unison therewith against revolving movement.

7. The combination with the main frame of a plow and a plurality of furrow openers carried thereby, of a crank axle journaled in the main frame, a land wheel journaled on the free end of the crank axle, a bracket member secured to the arm of the crank axle, a shaft turnably mounted therein, a gear secured on said shaft, a crank arm secured on the shaft, a link attached at one end to said crank arm and connected at its opposite end to the frame, a lever fulcrumed on the opposite end of the crank arm, means on the lever operable by the land wheel for transmitting the tractive power of the land wheel to revolve the gear, and means for swinging the lever to render the first means operative relative to the land wheel.

8. The combination with the main frame of a plow and a plurality of furrow openers carried thereby, of a crank axle journaled in the main frame, a land wheel journaled on the free end of the crank axle, a bracket member secured to the arm of the crank axle, a shaft turnably mounted therein, a gear secured on said shaft, a crank arm secured on one end of the shaft, a link attached at one end to said crank arm and connected at its opposite end to the frame, a lever mounted on the opposite end of the shaft, a gear pivoted on the lever in constant mesh with the first gear, power transmitting mechanism operated by the land wheel, means for normally holding the lever in position to prevent engagement of said second gear with said mechanism, means operated at will to move the lever to engage the second gear with said mechanism, and means for locking the lever in such position.

9. The combination with the main frame of a plow and a plurality of furrow openers carried thereby, of a crank axle journaled in the main frame, a land wheel journaled on the free end of the crank axle, a bracket member secured to the arm of the crank axle, a shaft turnably mounted therein, a gear secured on said shaft, a crank arm secured on the shaft, a link attached at one end to said crank arm and at the opposite end to a lever, a pair of rocker arms pivotally mounted on the axle, an intermediate gear journaled in one end of said arms and constantly intermeshing with the first named gear, a driving gear turnable in unison with the land wheel and means for swinging the rocker arms to move the intermediate gear into and out of mesh with the driving gear to revolve the first named gear and the crank arm and to raise and lower the crank axle with relation to the main frame.

10. The combination with the main frame of a plow and a plurality of furrow openers carried thereby, of a crank axle journaled in the main frame, a land wheel journaled on the free end of the crank axle, a bracket member secured to the arm of the crank axle, a shaft turnably mounted therein, a gear secured on said shaft, a crank arm secured on the shaft, a link attached at one end to said crank arm and at the opposite end to a lever, a pair of rocker arms pivotally mounted on the shaft, an intermediate gear journaled in one end of said arms and constantly intermeshing with the first named gear, a driving gear turnable in unison with the land wheel and means for swinging the rocker arms to move the intermediate gear into and out of mesh with the driving gear to revolve the first named gear and the crank arm and to raise and lower the crank axle with relation to the main frame, and means for locking the first named gear against revolving.

11. The combination with the main frame of a plow and a plurality of furrow openers carried thereby, of a crank axle journaled in the main frame, a land wheel journaled on the free end of the crank axle, a bracket member secured to the arm of the crank axle, a shaft turnably mounted therein, a gear secured on said shaft, a crank arm secured on the shaft, a link attached at one end to said crank arm and at the opposite end to a lever, a pair of rocker arms pivotally mounted on the shaft, an intermediate gear journaled in one end of said rocker arms and remaining in constant mesh with the first named gear, a driving pinion adapted to turn in unison with the land wheel, a lever pivotally mounted on the bracket, a link pivotally attached to the lower end of said lever at one end and to the rocking arms at the opposite end to permit the lever to rock the rocker arms to move the intermediate gear into and out of mesh with the driving pinion and means carried in part by the lever for locking the first named gear against revolving when the intermediate gear is out of mesh with the driving gear.

12. The combination with the main frame of a plow and a plurality of furrow openers carried thereby, of a crank axle journaled in the main frame, a land wheel journaled on the free end of the crank axle, a bracket member secured to the arm of the crank axle, a shaft turnably mounted therein, a gear secured on said shaft, a disk having a pair of notches formed therein, also secured to the shaft, a crank arm secured on the axle, a link attached at one end to said crank arm and at the opposite end to a lever, a pair of rocker arms pivotally mounted on the shaft, an intermediate gear journaled in one end of said rocker arms and remaining in constant mesh with the first named gear, a driving pinion adapted to turn in unison with the land wheel, a lever pivotally mounted on the bracket, a link pivotally attached to the lower end of said lever at one end and to the rocking arms at the opposite end to permit the lever to rock the rocker arms to move the intermediate gear into and out of mesh with the driving pinion and means carried by the lever for locking the first named gear against revolving when the intermediate gear is out of mesh with the driving gear, said means comprising a pawl carried by the lever, which is adapted to engage one or another of the notches formed in the disk.

In testimony whereof I have hereunto set my hand in the presence of two subscribing witnesses.

FRANCIS M. MECUM.

Witnesses:
   Guy R. Kennedy,
   U. F. Bailey.